(No Model.) 2 Sheets—Sheet 2.
J. T. ISH.
FRUIT PITTING MACHINE.
No. 445,753. Patented Feb. 3, 1891.
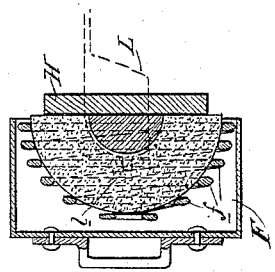
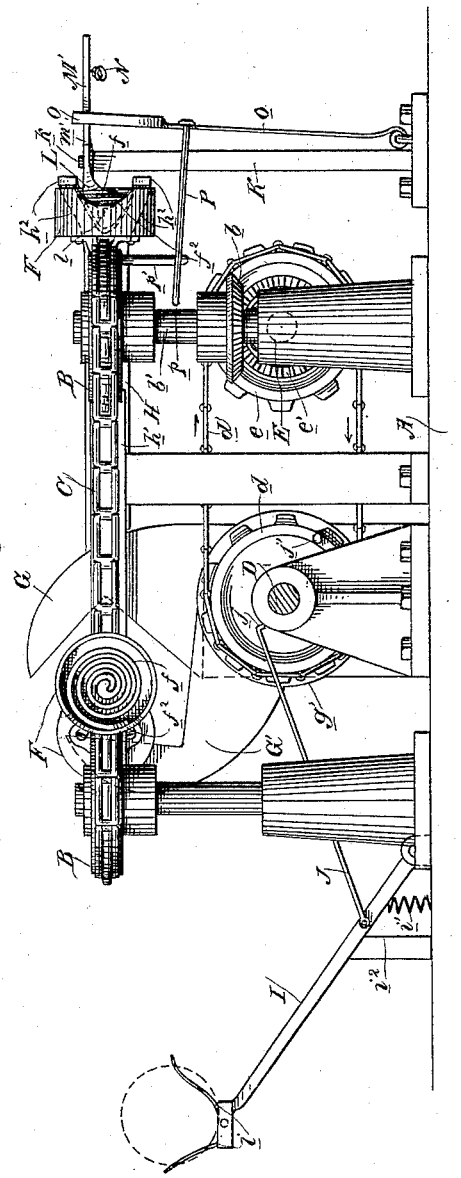
Witnesses,
Geo. H. Strong
J H Rouse
Inventor,
James T. Ish
By Dewey & Co.
Atty

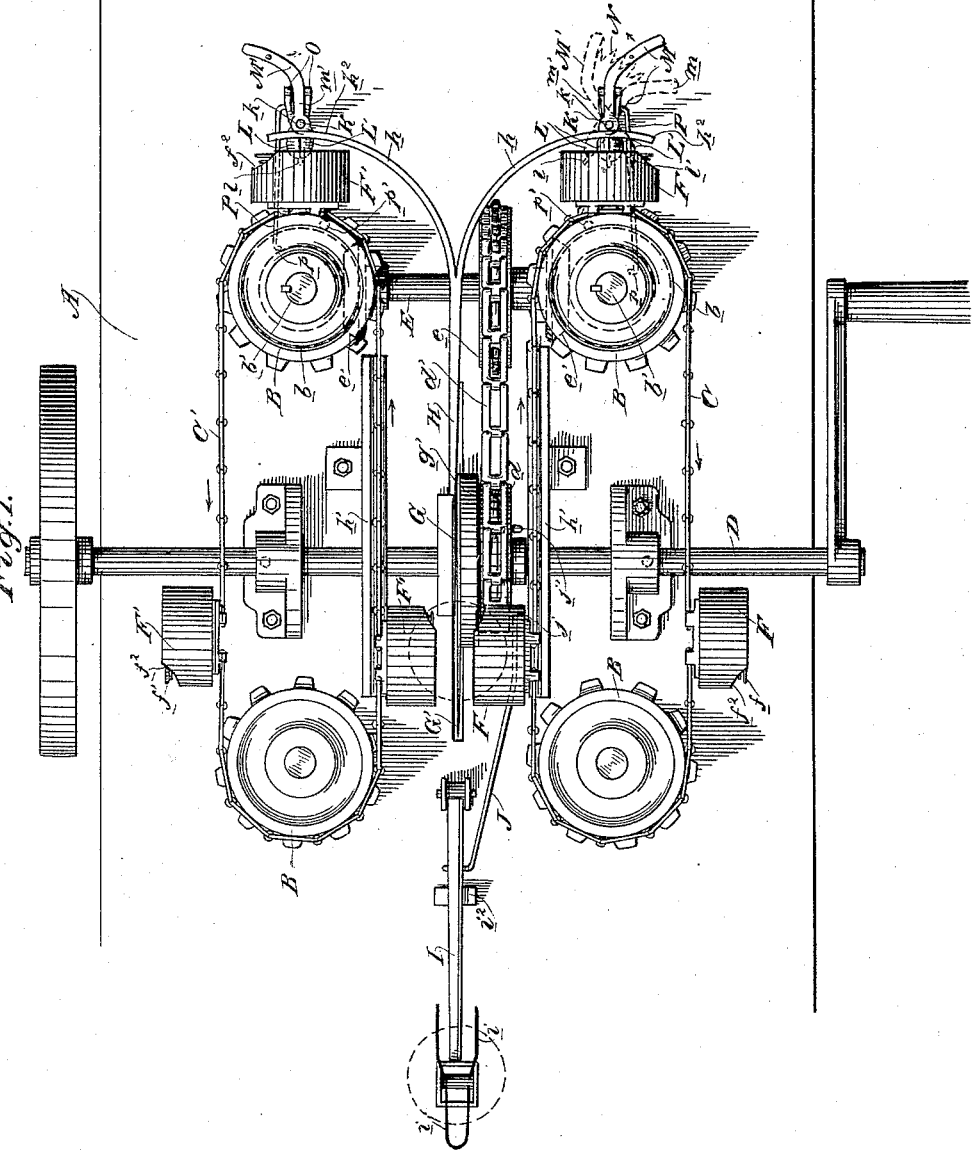

UNITED STATES PATENT OFFICE.

JAMES T. ISH, OF SAN FRANCISCO, CALIFORNIA.

FRUIT-PITTING MACHINE.

SPECIFICATION forming part of Letters Patent No. 445,753, dated February 3, 1891.

Application filed May 7, 1890. Serial No. 350,925. (No model.)

*To all whom it may concern:*

Be it known that I, JAMES T. ISH, a citizen of the United States, residing in the city and county of San Francisco, State of California, have invented an Improvement in Fruit-Pitting Machines; and I hereby declare the following to be a full, clear, and exact description of the same.

My invention relates to fruit-pitting machines; and it consists in the novel constructions and combinations of parts hereinafter fully described, and specifically pointed out in the claims.

The object of my invention is to provide a machine of this class in which both the flesh of the fruit and its pit are cut through and the several parts of the latter removed.

Referring to the accompanying drawings for a more complete explanation of my invention, Figure 1 is a plan of my machine. Fig. 2 is a side elevation of same. Fig. 3 is a section of one of the cups F.

A is the frame of the machine. At the four corners are mounted the horizontal sprocket-wheels B, over two of which passes longitudinally of the frame the endless traveling carrier C, and over the other two passes the opposing and similar carrier C'. These carriers are endless chains made up of jointed links, and they are mounted in the same horizontal plane, and so arranged that their inner sides travel close together and parallel in the same direction. Travel is imparted to them by means of a rotary drive-shaft D, which carries a sprocket-wheel $d$, from which an endless chain $d'$ extends to a sprocket-wheel $e$, mounted on a counter-shaft E, which carries at each end a bevel-pinion $e'$. These pinions mesh with bevel-gears $b$ on the vertical shafts $b'$, which carry at their upper ends the pair of sprocket-wheels B at one end of the machine.

To the carrier C are secured the cups F in suitable number, and to the carrier C' in corresponding positions are secured the cups F'. These cups are similar in construction and consist of hollow casings having their free ends open, and in said open ends are mounted the concave spiral springs $f$ and $f'$, which practically fill the ends and form cushion-holders for the fruit, which is introduced between opposing springs. The cups are so located on their respective carriers that one from each carrier as it comes around to begin its inward or forward journey is directly opposite and very close to a cup of the other carrier, so that receiving the fruit between their cushion holders or springs just as they are coming opposite one another they hold said fruit and carry it forward between them. The cups may have a cut-out portion in their sides at $f^2$, to permit the better introduction of the fruit between them.

Secured to the frame A is a stationary knife G, which lies in a plane between the cups, and consequently in the path of travel of the fruit.

G' is a revolving knife adapted to work against and past the knife G. The revolving knife is carried by a disk $g'$ on the main shaft D and comes up between the traveling cups and behind the fruit just as said fruit has reached the stationary knife, and between the two knives not only the flesh of the fruit, but the pit also, is cut clean through, leaving half of the flesh and half of the pit in each cup. Just behind the stationary knife is a central directing-plate H, which extends to the end of the machine and there is divided into branches $h$, which curve to each side, following for a distance the course of the two carriers. Therefore as soon as the cups pass the knife G the halved flesh and pit come up against and along the sides of the directing-plate H, which holds them in the cups, and they continue to be held in by the plate and its branches until, near the end of their course, their severed pits are extracted by a mechanism presently to be described.

In order to guide the backs of the carriers to cause them to hold the fruit up against the directing-plate and not to sag or sway, I place the angle-iron guide $h'$ behind them, so that they travel in the angle of said guides.

The means for feeding the fruit to the cups are as follows: At the front of the frame below is pivoted a swinging arm I, having at its upper end spring holding-strips $i$ for receiving and holding the fruit. The arm rests normally by means of a returning-spring $i'$ upon a fixed stop $i^2$, but is swung upwardly to carry its fruit into and between the cups by means of the link J, connected with it and having a bent free end $j$, adapted to be picked up by a pin or stud $j'$ on the sprocket-wheel $d$ of the driving-shaft D. Now when this pin or stud comes around it engages the bent end $j$ of link J, and carrying it forward raises the swinging arm I, the spring holder-strips $i$ of which thereby carry the fruit upwardly. The position and the time of movement is such that the fruit is carried by the holder-strips $i$ up to and between the cups just as they are coming together, so that when their cushion or spring holders come together on the fruit they take it from said holder $i$. Thereupon the bent end $j$ of link J slips the stud or pin $j'$ and the arm I is pulled back by its spring $i'$ to rest upon the stop $i^2$, and the spring holder-strips $i$ are ready for the reception of the next fruit.

At the discharge end of the machine are mounted the pit-removing nippers. There is one for each side.

K is a post. The bodies of the nippers are pivoted together and to the post-top at $k$. The jaws of the nippers are L and L', each spherically curved, and forming when brought together approximately a hemisphere. The jaws have the prongs $l$ and $l'$ projecting from their adjacent edges. The handles of the nippers are M and M', normally separated by a spring N to keep the jaws open. The handle M is straight for a short distance back and then is curved rapidly outwardly, as shown at $m$. The handle M' is curved rapidly at first, as shown at $m'$.

Secured to the base of the post K is a spring-shank $o$, having a fork O at its upper end, which embraces the nipper-handles M and M'. The spring-shank holds the fork normally out on the handles, so that the jaws are normally closed. Connected with the spring-shank is a link P, the inner end of which is bent at $p$. Upon the sprocket-wheels B are depending pins $p'$, which are adapted to come in contact with bent end $p$, and thereby to pull the link P forwardly, which draws together the spring-shank $o$ and fork O forwardly, the latter thus coming up to a point on the handles near their pivotal center, whereby the springs N open the handles and jaws ready for operation. Then when the pins $p'$ release the bent ends of link P the fork O is thrown backwardly by its spring-shank. The ends of the branches $h$ of directing-plate H are split at $h^2$ opposite the nipper-jaws, to allow the latter to work in against the fruit. The operation of the nippers is this: As the halved fruit and exposed halved pit come around opposite and right up to the open nipper-jaws, the pin $p'$ at that instant releases the bent ends $p$ of links P, whereby the forks O are thrown backwardly or outwardly, as above mentioned. The fork, passing along the curve $m'$ of handle M' and straight portion of handle M, has the immediate effect of closing said handles and consequently closing the jaws. These latter, with their prongs, enter the plane face of the halved fruit on each side of the severed pit and close in about said pit behind its convex surface. Then as the fork O reaches the outward curve $m$ of handle M, and as said fork travels straight, it, acting on said curve, causes the whole nipper implement to swing on its pivotal center at $k$ on post K in a curve opposite to the curve of travel of the fruit, whereby the jaws extract the halved pit with a quick twist, the prongs assisting in severing the pit from the flesh. The fork O is then drawn forward gradually and the nippers return to position, and their jaws open, ready for the next operation.

The general operation of the machine is as follows: The fruit is placed in the spring holders $i$ of arm I, which, swinging upwardly, delivers it between the traveling opposing cups, the cushion-holders of which retain it. The fruit is then brought into contact with the stationary knife and, the revolving knife coming up behind it at that instant, both the flesh and the pit are cut in halves. These pass on each side of and in contact with the directing-plate H and curve about its end branches. Then when opposite the nippers the latter act as above described and extract the severed pits.

Having thus described my invention, what I claim as new, and desire to secure by Letters Patent, is—

1. In a fruit-pitting machine, the opposing traveling carriers having correspondingly-located cups for receiving and holding the fruit between them, substantially as herein described.

2. In a fruit-pitting machine, the endless traveling carriers mounted opposite each other with their adjacent sides traveling in the same direction, said carriers having correspondingly-located cups which receive and hold the fruit between them when they approach each other and travel together, whereby the fruit is advanced, substantially as herein described.

3. In a fruit-pitting machine, the endless opposing carriers having correspondingly-located fruit-holding cups which approach and travel together on the adjacent sides of the carriers, in combination with the sprocket-wheels upon which said carriers are mounted, a driving-shaft, and connections therefrom to the sprocket-wheels for imparting a traveling movement to the carriers, substantially as herein described.

4. In a fruit-pitting machine, the opposing fruit-holding cups having in their open ends the holding-cushions between which the fruit is held, substantially as herein described.

5. In a fruit-pitting machine, the fruit-holding cup having in its open end the concave spiral spring forming a holding-cushion for the fruit, substantially as herein described.

6. In a fruit-pitting machine, a divided holder between the divisions of which the fruit is held, in combination with opposing knives in the plane of the division of the holder and working past each other to divide both the flesh and the pit of the fruit, substantially as herein described.

7. In a fruit-pitting machine, a divided holder between the divisions of which the fruit is held, in combination with a fixed knife and a movable knife working past the fixed knife, both knives being in the plane of the division of the holder, whereby both the flesh and the pit of the fruit are divided, substantially as herein described.

8. In a fruit-pitting machine, a divided holder between the divisions of which the fruit is held, in combination with a fixed knife and a revolving knife working past the fixed knife, said knives being in the plane of the division of the holder, whereby both the flesh and the pit of the fruit are divided, substantially as herein described.

9. In a fruit-pitting machine, a traveling divided or two-part holder consisting of independent parts between which the fruit is held and by which it is advanced, in combination with opposing knives in the path of the fruit and operating past each other in the plane of the division of the holder, whereby both the flesh and the pit of the fruit are divided, substantially as herein described.

10. In a fruit-pitting machine, the opposing traveling fruit-holding cups consisting of independent parts holding and carrying the fruit between them, in combination with the fixed knife in the path of the fruit and the revolving knife working past the fixed knife, whereby both the flesh and pit of the fruit are divided between said knives, substantially as herein described.

11. In a fruit-pitting machine, the opposing traveling carriers and the correspondingly-located cups carried thereby, and between which the fruit is held and advanced, in combination with the fixed knife and the revolving knife working past the fixed knife, said knives operating in the path of the fruit, whereby the flesh and pit of the fruit are divided, substantially as herein described.

12. In a fruit-pitting machine, the frame having the endless traveling carriers mounted upon the sprocket-wheels, the correspondingly-located cups on the carriers for receiving and advancing the fruit, the fixed knife, and the revolving knife, both in the path of the fruit, in combination with the drive-shaft carrying the revolving knife, and connections from said shaft to operate the carriers, substantially as herein described.

13. In a fruit-pitting machine, the combination of the opposing traveling holders, between which the fruit is carried, the knives for dividing its flesh and pit, and the directing-plate beyond the knives, in contact with which the divided flesh and pit travel to the end of the machine, substantially as herein described.

14. In a fruit-pitting machine, the combination of the endless traveling carriers, the fruit-holding cups carried thereby, the knives for dividing the flesh and pit of the fruit, the directing-plate for holding the severed flesh and pit in the cups, and the angled guides for the carriers, substantially as herein described.

15. In a fruit-pitting machine, the opposing traveling carriers and the fruit-holding cups carried thereby, in combination with the swinging arm having the fruit spring holder-strips and adapted to deliver the fruit into and between the opposing cups of the carriers as they approach each other, substantially as herein described.

16. In a fruit-pitting machine, the opposing traveling carriers and the fruit-holding cups carried thereby, in combination with the swinging arm having the spring holder-strips adapted to deliver the fruit into and between the opposing cups, and the means for actuating the swinging arm, consisting of the driving-shaft, a wheel thereon, a pin or stud on the wheel, the link connected with the swinging arm and having a bent free end adapted to be engaged and tripped by the pin or stud, and the spring for returning the arm, substantially as herein described.

17. In a fruit-pitting machine, the nippers for extracting the severed pit from the severed flesh, having the spherically-curved jaws, said nippers being pivoted together and having handle portions, substantially as herein described.

18. In a fruit-pitting machine, the nippers for extracting the severed pit from the severed flesh, having the spherically-curved jaws with prongs, said nippers being pivoted together and having handle portions, substantially as herein described.

19. In a fruit-pitting machine, and in combination with the traveling cups in which the fruit is carried, and knives for severing the flesh and pit of the fruit, the nippers for extracting the severed pits having the spherically-curved jaws, substantially as herein described.

20. In a fruit-pitting machine, and in combination with the traveling cups in which the fruit is carried and knives for dividing the flesh and pit of the fruit, the pit-extracting nippers at the end of the machine, having pivoted jaws and connections with the machine for operating said jaws to close them on the pit and open them again, substantially as herein described.

21. In a fruit-pitting machine having traveling fruit-holders and knives for dividing the flesh and pit of the fruit, the pit-extracting nippers at the end of the machine, having separable jaws adapted to close on the pit and relieve it, and the bent handles M and M', in combination with the swinging fork embracing the handles, whereby the jaws are operated, substantially as herein described.

22. In a fruit-pitting machine, and in combination with the traveling fruit-holders and knives for dividing the flesh and pit of the fruit, the swinging nippers having pivoted curved jaws for closing on the pit, the bent spring-controlled handles M and M', and the means for operating the jaws to engage the pit and for swinging the nippers to extract it, consisting of the swinging fork embracing and working on the handles, substantially as herein described.

23. In a fruit-pitting machine, and in combination with the traveling fruit-holders and knives for dividing the flesh and pit of the fruit, the swinging nippers having pivoted curved jaws for closing on the pit, the bent spring-controlled handles M and M', and the means for operating the jaws to engage the pit and for swinging the nippers to extract it, consisting of the swinging fork embracing and working on the handles, the spring-shank of said fork, the link connected with said shank and having a bent end, and the revolving pin for engaging and tripping the bent end of the link, substantially as herein described.

In witness whereof I have hereunto set my hand.

JAMES T. ISH.

Witnesses:
S. H. NOURSE,
H. C. LEE.